United States Patent [19]
Maddock et al.

[11] Patent Number: 5,762,475
[45] Date of Patent: Jun. 9, 1998

[54] AUTOMATIC SOLENOID CONTROL VALVE CALIBRATION

[75] Inventors: Jim B. Maddock, Washington; Brian W. Mann, Edwards; David R. Meinhold, Metamora, all of Ill.

[73] Assignee: Caterpillar Inc., Peoria, Ill.

[21] Appl. No.: 620,859

[22] Filed: Mar. 18, 1996

[51] Int. Cl.$^6$ ............................................. F04B 49/00
[52] U.S. Cl. ........................ 417/29; 417/34; 417/44.2; 417/44.3; 60/431
[58] Field of Search ................... 417/26, 29, 34, 417/44.2, 44.3; 60/431

[56] References Cited

U.S. PATENT DOCUMENTS

| | | | |
|---|---|---|---|
| 3,727,628 | 4/1973 | Habiger et al. | 137/101 |
| 3,768,338 | 10/1973 | Bahorich | 74/864 |
| 3,999,386 | 12/1976 | Crull et al. | 60/431 |
| 4,523,892 | 6/1985 | Mitchell et al. | 417/34 |
| 4,534,707 | 8/1985 | Mitchell | 417/34 |
| 4,846,283 | 7/1989 | Batcheller | 172/10 |
| 4,866,940 | 9/1989 | Hwang et al. | 60/646 |
| 4,916,641 | 4/1990 | Bybee | 364/550 |
| 5,040,648 | 8/1991 | Mitchell et al. | 192/3.58 |
| 5,214,916 | 6/1993 | Lukich | 60/431 |
| 5,272,647 | 12/1993 | Hayes | 364/551.01 |
| 5,456,333 | 10/1995 | Brandt et al. | 180/336 |
| 5,525,043 | 6/1996 | Lukich | 417/218 |
| 5,612,874 | 3/1997 | Schulz et al. | 364/424.08 |

FOREIGN PATENT DOCUMENTS 0111208 6/1984 European Pat. Off. .

Primary Examiner—Timothy Thorpe
Assistant Examiner—Xuan M. Thai
Attorney, Agent, or Firm—R. Carl Wilbur

[57] ABSTRACT

A calibration apparatus and method for calibrating a hydraulic control valve connected to an electronic controller. The electronic controller selects control signals and reads corresponding hydraulic pressure outputs of the hydraulic control valve and selectively records values corresponding to control signals that produce desired calibration pressures.

6 Claims, 5 Drawing Sheets

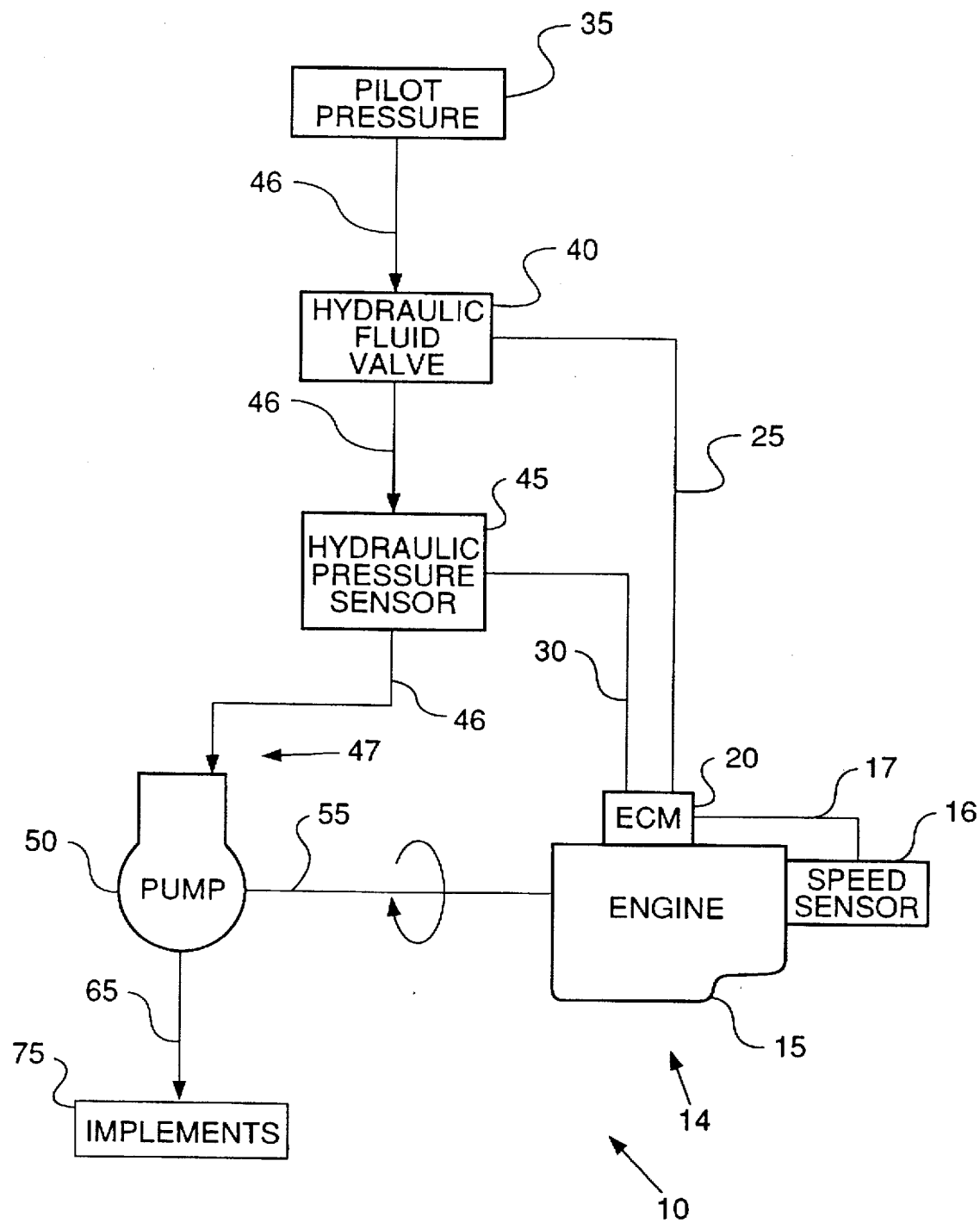

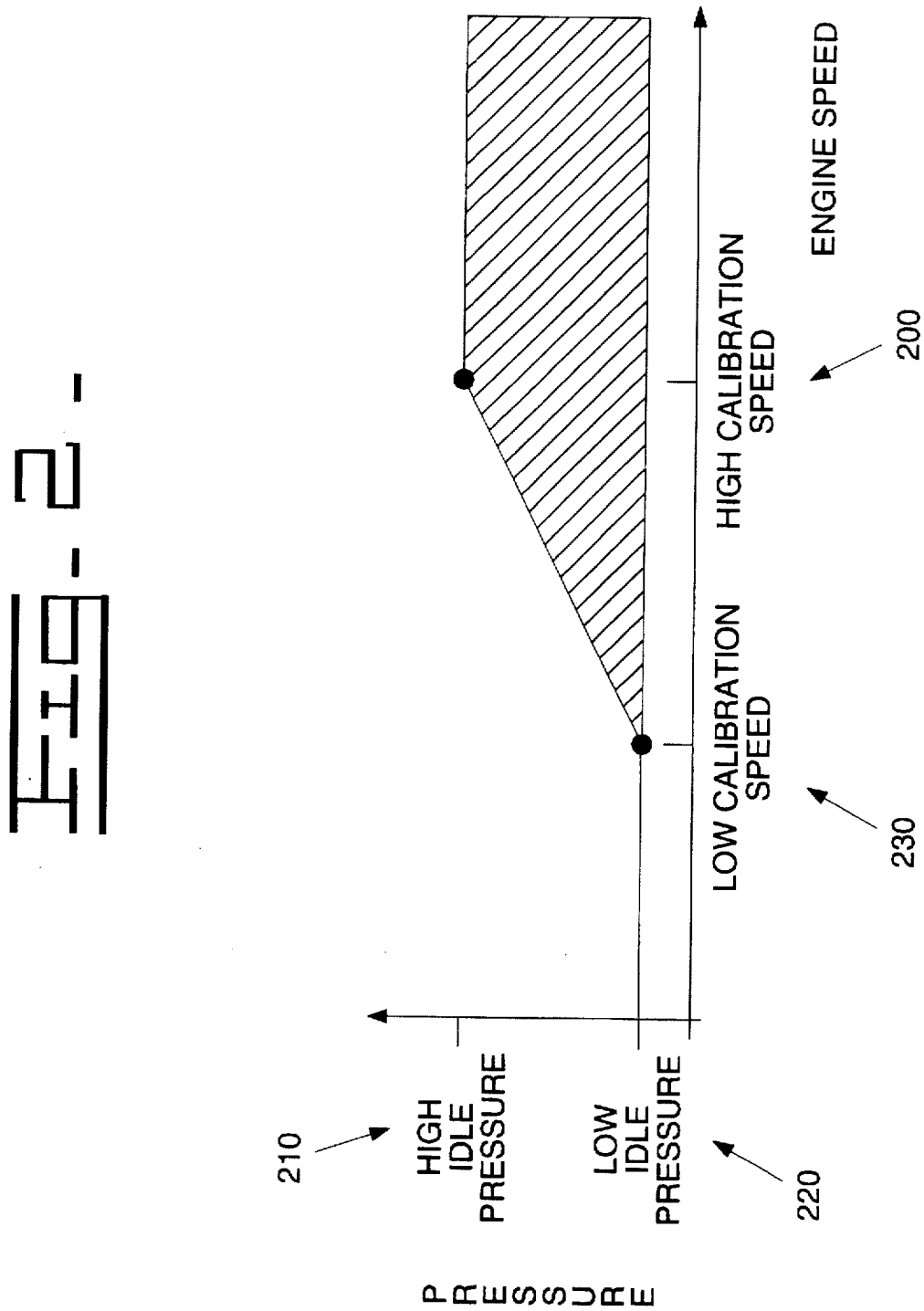

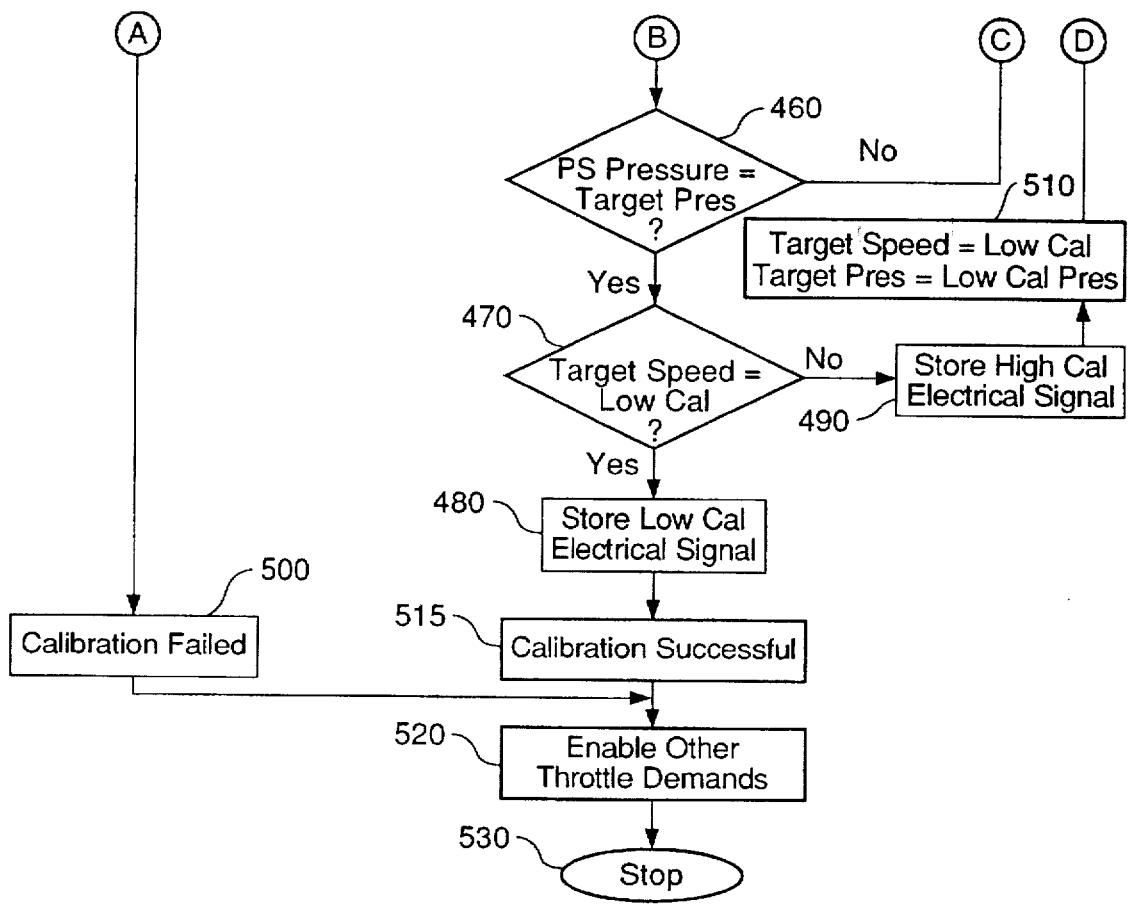

AUTOMATIC SOLENOID CONTROL VALVE CALIBRATION

TECHNICAL FIELD OF THE INVENTION

The present invention relates to electronic controls, and more particularly to an electronic control for calibrating an electronically controlled hydraulic valve.

BACKGROUND OF THE INVENTION

Equipment having hydraulic implements such as a front end loader with a hydraulic loader bucket or a bulldozer with a blade often use an internal combustion engine to provide power both to 1) the wheels or other means for propelling the equipment, and 2) to the implement. For example, an engine in a bulldozer will provide power to the bulldozer tracks to propel the bulldozer. At the same time, the operator may adjust the bulldozer blade controls. In response, the engine will drive a hydraulic pump to provide pressurized hydraulic fluid to the blade actuators to cause the blade to move. Thus, the engine may be required to power both the tracks and the implement simultaneously.

At most times the engine has sufficient power to perform both tasks. However, sometimes the combination of the power demanded by the tracks (or other means for propelling the equipment) and the power demanded by the tool may exceed the overall power output capability of the engine. In those cases, it is possible for the combined demand to cause the engine to lug down and provide insufficient power to both. When the engine lugs, continued power demands will cause the engine speed to decrease further thereby reducing the overall power output and in some cases decreasing engine speed to the point where the engine stalls.

To overcome this disadvantage, some prior art systems include an under speed control system. Those systems are designed to control engine speed to a rated speed. To do this, the engine control adjusts the power demand of the hydraulic implement or the propelling means when the combined demands exceed the rated engine power. Thus, the control will reduce the power output to the hydraulic implement or to the propelling means (or both) to help insure that the engine speed remains near rated speed and therefore does not lug down.

For the electronic controller to perform the under speed control accurately, it must be able to access a map or other means for determining the relationship between the electrical current applied to the hydraulic control valve and the output pressure of the valve. Typically this is stored as a relationship between desired pressure and the corresponding electrical current for two pressures: an upper and lower pressure limit. The output pressure of the valve is a function of both the electrical current applied to the hydraulic control valve and engine speed. The map is therefore three dimensional, correlating an output pressure to electrical current and engine speed. From the map, the electronic controller can determine an upper limit on the electrical current that is applied to the valve and also a lower limit.

In prior art systems, this map is produced manually by adjusting engine speed, then adjusting electrical current and measuring the resulting hydraulic pressure. These adjustments and measurements must be repeated for a variety of engine speeds and desired output pressures. This process is labor intensive and time consuming. It would be preferable to have an automatic calibration system to quickly and easily calibrate the control system..

SUMMARY OF THE INVENTION

In one aspect of the present invention a control is provided for automatically calibrating an electronically controlled hydraulic valve. Generally the invention includes a power source connected to a hydraulic pump. A pressure sensor is hydraulically connected to the pump and is electronically connected to an electronic controller. An electronically controlled hydraulic valve is hydraulically connected to the pressure sensor. The electronic controller produces control signals that are delivered to the hydraulic control valve and varies those signals and reads corresponding pressure signals. In this manner, the present invention automatically calibrates the control valve.

Other aspects and advantages of the present invention will become apparent upon a detailed reading of the specification in connection with the appended claims and attached drawings.

BRIEF DESCRIPTION OF THE FIGURES

FIG. 1 is a system level block diagram of an embodiment of the present invention;

FIG. 2 is a graph showing various features of the calibration performed in an aspect of the present invention; and FIGS. 3a–3c represent a flowchart of a preferred embodiment of the software used in an aspect of the present invention.

DETAILED DESCRIPTION OF A PREFERRED EMBODIMENT OF THE INVENTION

Figure 3A:
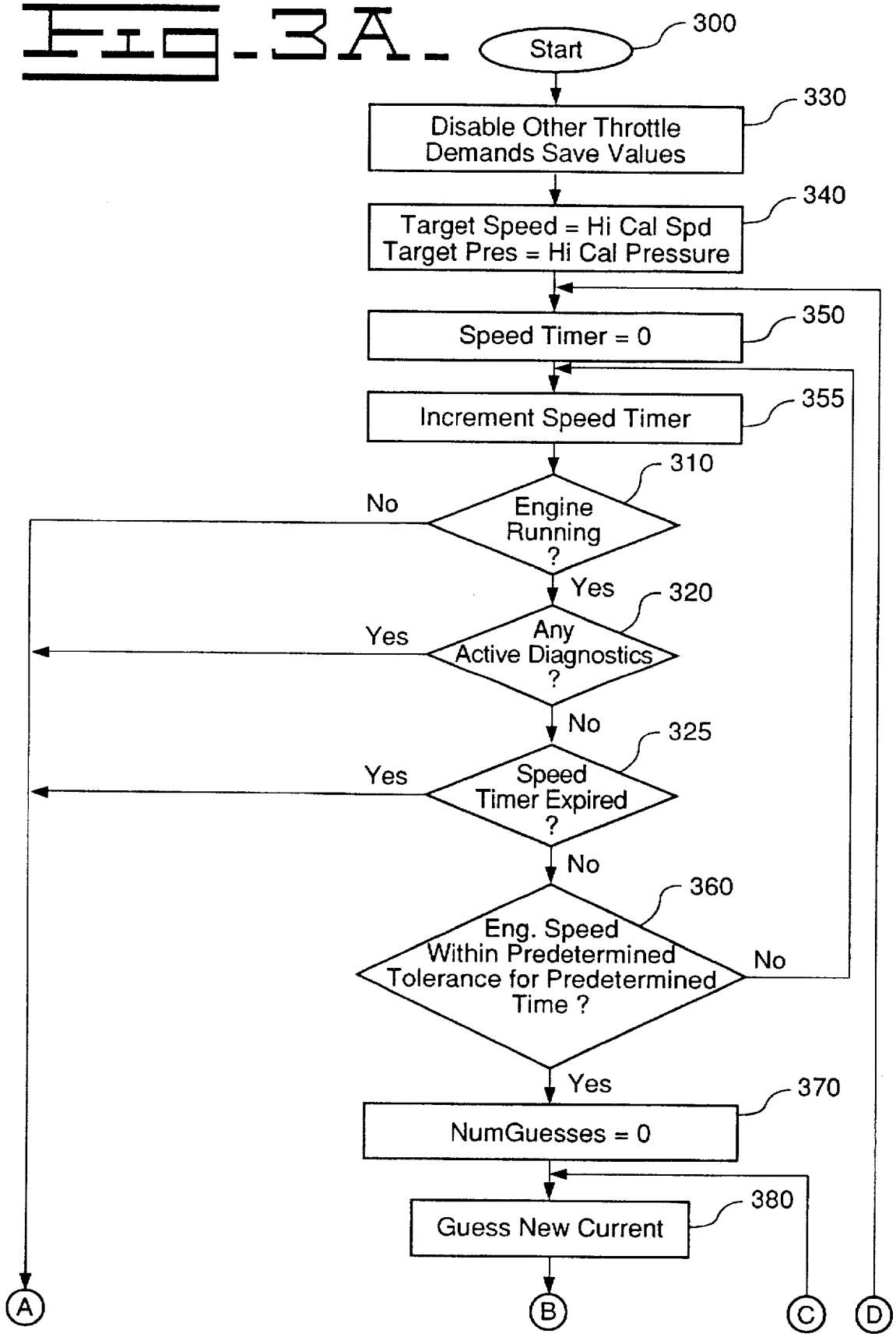

In the following detailed description of a preferred embodiment, like reference numerals are used to refer to like elements, where appropriate. Referring first to FIG. 1, a system level block diagram of the components of a preferred embodiment of the calibration system 10 is shown. The calibration system 10 preferably includes a power source 14. In a preferred embodiment, the power source 14 includes an internal combustion engine 15 that is electronically controlled by an electronic controller 20. However, in other applications of the present invention the power source 14 might include an electrical motor, a hydraulic motor or other similar device. In a preferred embodiment, the electronic controller 20 includes a MC68HC11 microprocessor manufactured by Motorolla, Inc. headquartered in Schaumburg, Ill. The electronic controller 20 also includes memory, input channels and other features known in the art. The electronic controller 20, among other things, controls the operation of the engine. Electronic control of an internal combustion engine is well known in the art. The specifics of such control, therefore, will not be described herein except as they directly relate to, and are required for a full and complete understanding of, the calibration control of the present invention.

As shown in FIG. 1, a speed sensor 16 is connected to the internal combustion engine 15 and provides an engine speed signal to the electronic controller 20 over electrical connector 17. A hydraulic pump 50 is also connected to the internal combustion engine 15. Traditionally, the connection 55 is a mechanical connection and is used to drive the pump 50.

The electronic controller 20 is electrically connected to an electronically controlled hydraulic fluid valve 40 and to a hydraulic pressure sensor 45. The hydraulic fluid valve 40 is installed in a hydraulic fluid conduit 46 and that opens and restricts the flow of hydraulic fluid in the conduit 46 as a function of an electrical signal received from the electronic controller 20 over an electrical connection 25. Thus, by varying the electrical signal, the electronic controller 20 can increase or decrease the pressure in the hydraulic fluid conduit 46. The hydraulic pressure sensor 45 is also installed in the conduit 46 and produces a pressure signal on an electrical connector 30 that is a function of the hydraulic fluid pressure.

The hydraulic fluid conduit 46 is attached to a pressure source 35. This pilot pressure source 35 is well known in the art. Typically, such pressure is provided by a separate pump or other pressure reducing type valve. However, other means for providing the pilot pressure could be used without deviating from the scope of the present invention as defined by the appended claims. The pilot pressure may be reduced by the hydraulic fluid valve 40 depending on the electrical signal on the electrical connector 25. The hydraulic pressure at an end 47 of the conduit 46 connected to the pump 50 is a function of the original pilot pressure 35 and the electrical signal on connector 25. As is known to those skilled in the art, the output of the pump 50 is a function of the pressure of the hydraulic fluid entering the pump at the end 47 of the conduit 46. Thus, the hydraulic flow produced in conduit 65 connected to the implement 75 and the pressure in conduit 65 connected to the pump output 60 is a function of the hydraulic pressure at the end 47 of the conduit. To determine the output pressure that a given electrical signal will produce, it is first necessary to calibrate the control valve 40 to produce a mapping relationship between the electrical signal and the pressure produced in conduit 46. An embodiment of the present invention measures that relationship.

Referring now to FIG. 2, a graphical representation of the function of the calibration system 10 is shown. When the vehicle operator or other personnel initiates a calibration sequence, the electronic control 20 causes the engine speed to increase to a high calibration speed 200. The electronic controller 20 will then monitor the pressure signal on the electrical connector 30. The electronic controller 20 systematically varies the electrical signal to the hydraulic control valve 40 until the hydraulic pressure signal is within a predetermined tolerance of a selected high calibration hydraulic pressure 210 value. In a preferred embodiment, for example, the electronic controller 20 increases the engine speed to within 15 RPM of the high calibration speed and then varies the control signal to the hydraulic valve 40 until the pressure signal indicates a pressure on the end 47 of the conduit 46 of about 2450 kPa. The electronic controller 20 then stores in memory the value of the control signal that produced the selected high calibration pressure 210.

The electronic controller 20 then causes the engine speed to decrease to a low calibration speed and performs a similar calibration. Once the engine speed has reached within a predetermined tolerance of the low calibration speed 230, the electronic controller 20 varies the control signal on the connector 25 to the hydraulic control valve 40 until the pressure signal on the electrical connector 30 indicates that the hydraulic pressure at the end 47 of the conduit 46 is within a predetermined tolerance of a selected low calibration hydraulic pressure level. In a preferred embodiment, for example, the electronic controller decreases the engine speed to within 15 RPM of the low calibration speed and then varies the control signal to the hydraulic valve 40 until the pressure signal indicates a pressure on the end 47 of the conduit 46 of about 800 kPa. The electronic controller 20 then stores in memory the value of the control signal that was required to produce the second predetermined hydraulic pressure.

Figure 3B:
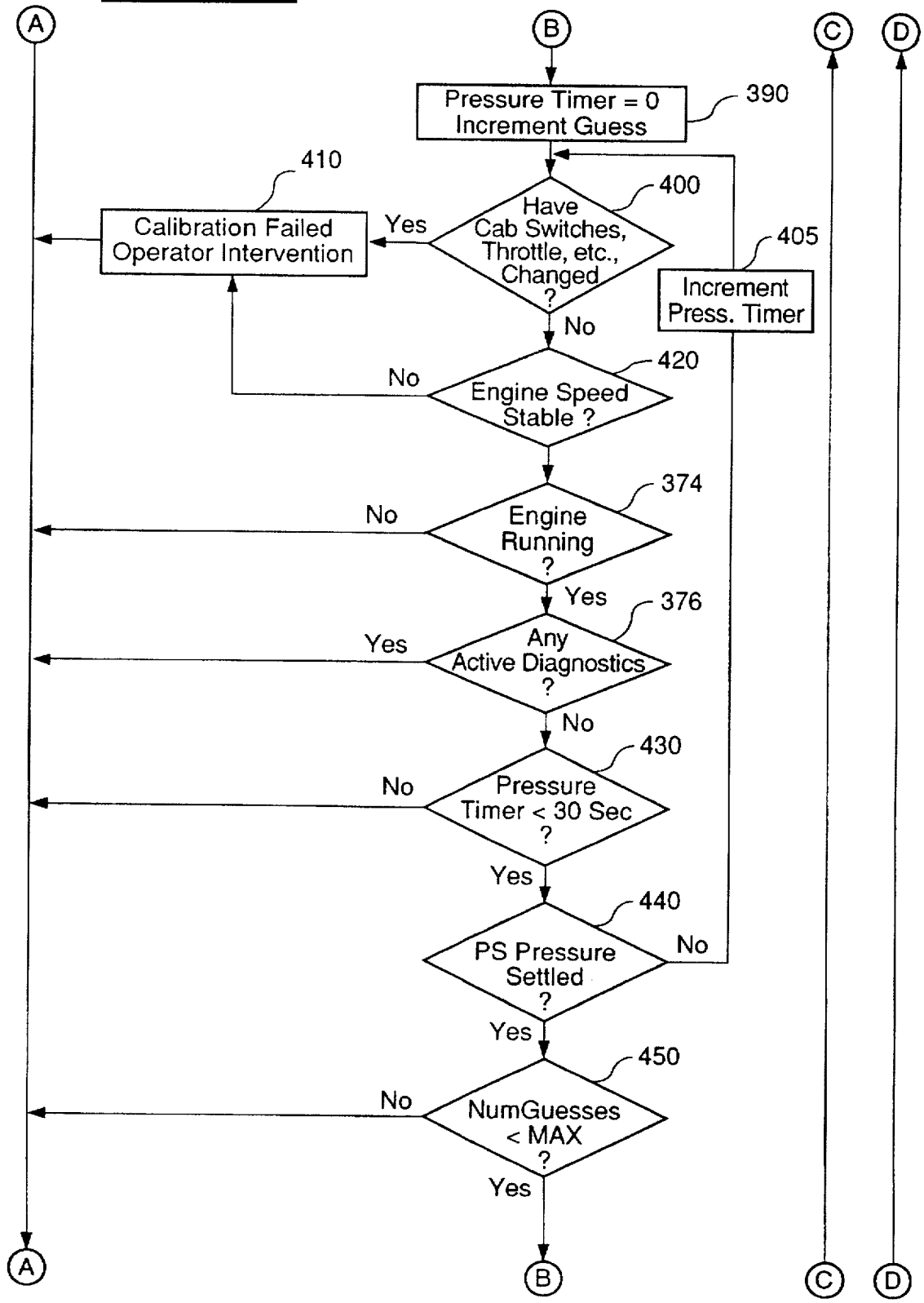

Referring now to FIGS. 3a–3c, a detailed flowchart of a preferred embodiment of the software for programming the electronic controller 20 is shown. The program depicted in this flowchart is particularly well adapted for use with the MC68HC11 microprocessor and associated components described above, although any suitable microprocessor may be utilized in practicing an embodiment of the present invention. These flowcharts constitute a complete and workable design of the preferred software program, and have been reduced to practice on the above-referenced series microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

The calibration routine is initiated by a service technician through the use of a service tool. Such devices are generally connected to a data port on the equipment and provide communication means for the technician to provide instructions to, or otherwise communicate with, the electronic controller 20. Such devices are known in the art. In a preferred embodiment of the present invention, the service technician will enter instructions into the service tool for the electronic controller to initiate calibration. Although a preferred embodiment contemplates initiating the calibration with a service tool other means could be employed. For example, it is possible to provide the vehicle operator with a switch or keypad, located in the operator compartment or elsewhere on the equipment, which would cause calibration to begin when the operator provide a correct input. The calibration routine could also be automatically performed after the expiration of a predetermined elapsed time or other factor, or the controller 20 could sense the pressure when a high current command is issued and if the pressure is more than a predetermined value from the desired high pressure, then the controller could initiate a calibration. These and other means for initiating a calibration could be readily and easily employed in an embodiment of the present invention.

Block 300 begins a preferred embodiment of the software of the present invention. Program control passes from block 300 to block 330.

In block 330 the electronic controller 20 disables other engine control strategies that may produce an engine throttle demand. The electronic controller 20 also stores the value of the current throttle demand in memory and stores the value of other sensors, inputs and values that might be changed during by the calibration routine so that those values can be restored once calibration has ended. Program control then passes to block 340.

In block 340, the electronic controller 20 sets the target engine speed to the high calibration speed 200 and the target pressure to the high calibration pressure 210 value. The electronic controller 20 then causes the engine speed to increase toward the target engine speed. Program control then passes to block 350.

In block 350, the electronic controller 20 initializes a speed timer to zero. The speed timer is a variable that is incremented each time the electronic controller 20 checks the engine speed to determine whether it is running at or near a predetermined desired speed, for example the high calibration speed or the low calibration speed. Once the speed timer variable is initialized, program control passes to block 355.

In block 355, the electronic controller 20 increments the speed timer variable. Program control passes from block 355 to block 310.

In block 310, the electronic controller 20 monitors a signal from an engine speed sensor 16 to determine whether or not the engine is running. Typically, the electronic controller 20 would verify that the signal indicates that the engine speed is greater than a cranking speed and is at least at a minimum idle speed. If the electronic controller determines that the engine speed sensor 16 signal indicates that the engine is running, then program control passes to block 320. Otherwise program control passes to block 500.

In block 320, the electronic controller 20 monitors various electrical signals and memory locations in the electronic controller to determine whether any diagnostics are active (i.e. whether a fault condition exists). For example, the electronic controller 20 monitors the electrical signals over electrical connectors 25, 30 to determine that the hydraulic pressure sensor 45 and the hydraulic fluid valve 40 are operating properly. If there are no active diagnostics, then program control passes to block 325. Otherwise, program control passes to block 500.

In block 325, the electronic controller 20 determines whether the speed timer has expired. That is, the controller 20 compares the speed timer value to a predetermined maximum engine speed settle time and if the speed timer value exceeds predetermined maximum engine speed settle time then program control passes to block 500. Otherwise, program control passes to block 360. In this manner, block 325 prevents program control from entering an endless loop that might otherwise ensue if the engine speed never reached a predetermined tolerance of the target engine speed. In a preferred embodiment, the predetermined time is about 30 seconds. Thus, in a preferred embodiment, if the actual engine speed has not settled as described in block 360 then program control passes to block 500.

In block 360, the electronic controller 20 checks to determine whether the actual engine speed is within a predetermined tolerance of the target engine speed for a predetermined time period. In a preferred embodiment, if the actual engine speed is within ±15 RPM of the target engine speed and stays within that window for more than five seconds, the program control passes to block 370. Although a preferred embodiment of the present invention uses five seconds and thirty seconds as the predetermined time periods, other time periods can be readily and easily be used without deviating from the scope of the present invention.

In block 370, the electronic controller 20 begins a search routine to determine the control signal value that will cause the hydraulic control valve 40 to produce the desired high calibration pressure 210 in conduit 46. In block 370, the electronic controller 20 sets a dummy variable NUMGUESSES to zero. Program control then passes to block 380.

In block 380, the electronic controller 20 selects a first electrical current for the control signal to the hydraulic control valve 40. In a preferred embodiment, a binary search routine is used. However, other search routines could readily and easily be used without deviating from the scope of the present invention as defined by the appended claims.

In using a binary search routine, the electronic controller 20 has stored a minimum and maximum value as endpoints for the search. In a preferred embodiment, the initial endpoints are 0 and 1.0 amps. These values are determined by the specifications of the specific hydraulic valve 40 that is to be calibrated. The initial guess in the binary search is one-half the sum of the minimum and maximum values. The pressure produced by that electrical current will be either 1) above target pressure; 2) below target pressure; or 3) within a predetermined threshold of the target pressure.

In case of 1), where the pressure is above target, the corresponding electrical current value is substituted as the new maximum value for the next iteration of the search. In the case of 2) the electrical current value is substituted for the minimum value for the next iteration. And, in the case of 3) the search ends. In a preferred embodiment, the predetermined threshold pressure is about ±40 kPa although other values could be used. Before taking a pressure reading after the electronic controller 20 has changed the electrical current (based on a new guess in the binary search) the controller 20 must determine that the resulting pressure has settled. In a preferred embodiment, the controller 20 assumes that the pressure has settled if consecutive readings within a five second period do not deviate by more than about 80 kPa. If the pressure has not settled with a 15 second period, then the controller indicates that there has been a calibration error.

In block 390, the electronic controller 20 sets a timer value to zero. As will be explained more fully below, the timer value is used to make sure that the hydraulic pressure settles to a steady state value within a predetermined time limit. The electronic controller 20 also increments the dummy variable NUMGUESSES, which keeps track of the number of times the controller has selected a different electrical current for the control signal. Program control then passes to block 400.

In block 400, the electronic controller 20 compares the current throttle position to the throttle position stored in memory in block 330. If the current throttle position is different from the throttle position stored in memory, then the operator has moved the throttle control. In this case, program control passes to block 410 where the electronic controller 20 generates a signal to an operator display or other alarm device indicating that the calibration did not complete because of operator intervention. Program control then passes to block 500. If, however, the current throttle position is the same as the throttle position stored in memory then the operator has not intervened and program control passes to block 420.

In block 420, the electronic controller 20 monitors the engine speed signal generated by the engine speed sensor 16 to determine whether the engine speed is stable. The controller accomplishes this by taking successive engine speed readings and determining whether the difference between the successive readings exceeds a predetermined value. Significant changes in the engine speed may result from the operator attempting to use the implement and causing the engine to lug. Reduced engine speeds are therefore possible even though the operator has not manually changed the throttle position. If the engine speed is not stable then program control passes to block 410 where the electronic controller 20 generates a signal to an operator display or other alarm device indicating that the calibration did not complete because of operator intervention. Program control then passes to block 500. If, however, the engine speed is stable, program control passes to block 374.

In block 374, the electronic controller 20 monitors a signal from an engine speed sensor 16 to determine whether or not the engine is running. Typically, the electronic controller 20 would verify that the signal indicates an engine speed greater than a cranking speed and is at least at a minimum idle speed. If the electronic controller determines that the engine speed sensor 16 signal indicates that the engine is running, then program control passes to block 376. Otherwise program control passes to block 500.

In block 376, the electronic controller 20 monitors various electrical signals and memory locations in the electronic controller to determine whether any diagnostics are active (i.e. whether a fault condition exists). For example, the electronic controller 20 monitors the electrical signals over electrical connectors 25, 30 to determine that the hydraulic pressure sensor 45 and the hydraulic fluid valve 40 are operating properly. If there are no active diagnostics, then program control passes to block 430. Otherwise, program control passes to block 500.

In block 430, the electronic controller 20 determines whether the timer has exceeded a predetermined time limit, which in a preferred embodiment is thirty seconds. The time limit is used to prevent the control from entering a never ending loop formed by blocks 374, 376, 400, 405, 420, 430, and 440, which would result if the pressure signal never stabilized. Thus, if the pressure has not stabilized within the predetermined time limit, then program control passes to block 500. Otherwise, program control passes to block 440.

In block 440 the electronic controller 20 determines whether the hydraulic pressure in the conduit 46 as measured by the pressure sensor 45 has stabilized in response to the selected electrical signal. The controller accomplishes this by taking successive pressure readings and verifying that the difference between successive readings is less than a predetermined pressure tolerance. If the pressure has not stabilized, then program control passes to block 405 and then loops back to block 400. In block 405, the controller 20 increments the pressure timer value. If the pressure has not stabilized then program control passes to block 450.

In block 450, the electronic controller 20 compares the number of times it has changed the control signal with a maximum value. If the NUMGUESSES variable exceeds the maximum value, then the target pressure was not successfully produced during the calibration and program control passes to block 500. Otherwise, if the variable NUMGUESSES is less than the maximum value, program control passes to block 460.

In block 460, the electronic controller 20 reads the pressure signal on the electrical connector produced by the pressure sensor 45. If the pressure signal is within a predetermined tolerance of the target pressure then program control passes to block 470. Otherwise, program control returns to block 380, where the electronic controller selects a new electrical current.

In block 470, the electronic controller 20 determines whether the current target speed is equal to the low calibration speed 230. If it is, then the calibration is completed and program control passes to block 480.

In block 480, the electronic controller 20 stores a value indicative of the control signal that produced the low idle pressure 220. Program control then passes to block 515.

In block 515, the electronic controller 20 produces a signal that causes an operator display or other alarm device to indicate to the equipment operator that the calibration was successfully completed. Program control then passes to block 520.

In block 520, the electronic controller 20 enables the other engine control strategies that were previously disabled in block 330. Program control then passes to block 530 where the software ends.

Returning now to block 470, if the target speed is not equal to the low calibration speed then the calibration must also be performed for the low calibration speed 230 and program control passes to block 490.

In block 490, the electronic controller 20 stores a value indicative of the control signal that produced the high idle pressure 210. Program control then passes to block 510.

In block 510, the electronic controller sets the target engine speed to the low calibration speed value 230 and sets the target hydraulic pressure to the low calibration pressure 220. Program control then passes to block 350. In blocks 350 through 460 the same calibration as described above is performed with the low calibration speed 230 and low calibration pressure 220. The steps involved in calibrating at the low calibration speed and low calibration pressure are similar to those described above with respect the high calibration speed and high calibration pressure and therefore will not be repeated here. Once these steps are completed the low calibration speed and low calibration pressure, and the control signal is found that produces the desired low calibration pressure, program control passes to block 470. Since the target engine speed is set to the low calibration speed, program control then passes to block 480.

In many of the foregoing program control blocks(e.g. 310, 320, 325, 410, 374, 376, 430, 450) a condition may exist that causes the calibration of a preferred embodiment of the present invention to end. In those situations, as described above, program control then passes to block 500. In block 500, the electronic controller 20 produces a calibration failed signal which causes a display or other indicator to notify the equipment operator that the calibration failed. In a preferred embodiment, the indicator is a display on the service tool. However, other indicators including lights or buzzers could readily and easily be substituted without deviating from the present invention as defined by the appended claims.

From the foregoing description it is clear that an embodiment of the present invention automatically calibrates an electronically controlled hydraulic valve. When the operator starts the calibration routine, the engine automatically goes to the high calibration speed unless the operator manually intervenes by pressing the throttle or by attempting to operate the implement. Once at high calibration speed, the electronic controller varies the electrical current applied to the control valve until the hydraulic pressure reaches a desired high calibration pressure. The magnitude of that electrical current is then stored in memory. Then, the engine speed will automatically slow to the low calibration speed and the electronic controller will vary the electrical current to the hydraulic valve until the hydraulic pressure reaches a desired low calibration pressure. The electrical current that was applied to the hydraulic valve to produce the desired pressure is then stored in memory. By knowing the low calibration pressure electrical current and the high calibration pressure electrical current the electronic controller 20 can then interpolate between those two points to determine the necessary current for desired pressures between the high idle pressure and the low idle pressure.

By using the present invention, the hydraulic control valve is automatically calibrated, and eliminates the need for a manual calibration of the valve.

We claim:

1. An apparatus comprising:

a power source;

a hydraulic pump connected to said power source;

a hydraulic pressure sensor hydraulically connected to said pump, said sensor producing an electrical signal indicative of hydraulic fluid pressure;

an electronically controlled hydraulic fluid valve hydraulically connected to said hydraulic pressure sensor, said control valve having a plurality of positions, each of said positions producing an associated output hydraulic pressure;

electronic control means for producing an electrical control signal delivered to said hydraulic fluid control valve and for varying said control signal and reading corresponding pressure signals;

a speed sensor, said speed sensor producing a speed signal indicative of a rotational speed of said power source;

wherein said electronic control means produces a desired high calibration pressure value, wherein said desired high calibration pressure is a desired hydraulic pressure when the power source is running at a high calibration speed;

wherein said electronic control means produces a desired engine speed signal corresponding to said desired high calibration speed;

wherein said electronic control means produces an electrical control signal and reads a corresponding hydraulic pressure;

wherein said electronic control means compares said corresponding hydraulic pressure to said desired high calibration pressure value and varies the electrical control signal as a function of said comparison; and wherein said electronic control means repeatedly varies said electrical control signal and compares said corresponding hydraulic pressure to said desired high idle pressure value until said corresponding hydraulic pressure is within a predetermined tolerance of said desired high idle pressure value.

2. An apparatus according to claim 1, wherein:

said electronic control means produces a desired low calibration pressure value, wherein said desired low calibration pressure is a desired hydraulic pressure when the power source is running at a low calibration speed;

said electronic control means produces a desired engine speed signal corresponding to said desired low calibration speed;

said electronic control means produces an electrical control signal and reads a corresponding hydraulic pressure;

said electronic control means compares said corresponding hydraulic pressure to said desired low idle pressure value and varies the electrical control signal as a function of said comparison;

said electronic control means repeatedly varies said electrical control signal and compares said corresponding hydraulic pressure to said desired low idle pressure value until said corresponding hydraulic pressure is within a predetermined tolerance of said desired low idle pressure value.

3. An apparatus according to claim 1, wherein said power source includes an internal combustion engine.

4. An apparatus according to claim 1, wherein said electronic control means includes a microprocessor.

5. A method for automatically calibrating a hydraulic control valve, said method comprising the steps of;

selecting a desired calibration pressure value of said hydraulic control valve;

issuing a control signal to said hydraulic control valve;

reading a hydraulic pressure produced by said hydraulic control valve in response to said control signal;

comparing said hydraulic pressure to said desired calibration value;

using a search algorithm to select a different control signal in response to said step of comparing when said hydraulic pressure is outside a predetermined tolerance of said desired calibration value; and recording a value representative of said control signal in response to said step of comparing when said hydraulic pressure is within a predetermined tolerance of said desired calibration value.

6. The method according to claim 5, including the steps of:

issuing said different control signal to said hydraulic control valve;

reading a hydraulic pressure produced by said hydraulic control valve in response to said different control signal;

comparing said hydraulic pressure to said desired calibration value; and recording a value representative of said different control signal in response to said step of comparing if said hydraulic pressure is within a predetermined tolerance of said desired calibration value; and repeating said steps of using, issuing reading, comparing and recording in response to said hydraulic pressure being outside a predetermined tolerance of said desired calibration value.

* * * * *